(12) United States Patent
Alstyne et al.

(10) Patent No.: US 7,503,070 B1
(45) Date of Patent: Mar. 10, 2009

(54) METHODS AND SYSTEMS FOR ENABLING ANALYSIS OF COMMUNICATION CONTENT WHILE PRESERVING CONFIDENTIALITY

(75) Inventors: Marshall Van Alstyne, 44 Barbara Rd., West Newton, MA (US) 02465; Jun Zhang, Ann Arbor, MI (US)

(73) Assignee: Marshall Van Alstyne, Boston, MA (US)

( * ) Notice: Subject to any disclaimer, the term of this patent is extended or adjusted under 35 U.S.C. 154(b) by 872 days.

(21) Appl. No.: 11/080,708

(22) Filed: Mar. 15, 2005

Related U.S. Application Data

(63) Continuation-in-part of application No. 10/944,644, filed on Sep. 17, 2004, now abandoned.

(60) Provisional application No. 60/504,383, filed on Sep. 19, 2003.

(51) Int. Cl.
 *G06F 21/00* (2006.01)
(52) U.S. Cl. ...................................................... 726/22
(58) Field of Classification Search ..................... 726/22
 See application file for complete search history.

(56) References Cited

U.S. PATENT DOCUMENTS

| 6,820,081 | B1 | 11/2004 | Kawai et al. | |
|---|---|---|---|---|
| 7,058,543 | B2 * | 6/2006 | Takahashi et al. | 702/183 |
| 2002/0016918 | A1 | 2/2002 | Tucker et al. | |
| 2002/0196292 | A1 * | 12/2002 | Itoh et al. | 345/853 |
| 2003/0149727 | A1 * | 8/2003 | Jaschek et al. | 709/206 |
| 2005/0105712 | A1 * | 5/2005 | Williams et al. | 379/265.02 |

OTHER PUBLICATIONS

"E-mail Communications Management", The Morphix Company,2 pages.
Brynjolfsson, Erik , et al., "Information Worker Productivity: Task Level Evidence", (Nov. 9, 2004),30 pages.
Bulkley, Nathaniel , et al., "Why Information Should Influence Productivity", *The Network Society: A Global Perspective*, 28 pages.
Carley, Kathleen M., "Dynamic Network Analysis", *Summary of NRC Workshop on Social Network Modeling and Analysis*, 1-13.
Girvan, M , et al., "Community Structure in Social and Biological Networks", *Proc. Natl. Acad. Sci.*, USA 99, 8271-8276.
Guimera, R , et al., "Self-Similar Community Structure in Organisations", [http://xxx.arxiv.org/abs/cond-mat/0211498], (2003).

(Continued)

*Primary Examiner*—Gilberto Barron, Jr.
*Assistant Examiner*—Shahrouz Yousefi
(74) *Attorney, Agent, or Firm*—Perkins Coie LLP

(57) ABSTRACT

Disclosed are methods and systems for enabling analysis of communication content while preserving confidentiality. In one embodiment, communication content is processed to increase the similarity of superficially dissimilar instances of communication content and/or to increase the distinctiveness of superficially similar instances of communications content. In this embodiment at least part of the processed communication content is hashed to obscure the actual communication content. In one embodiment, social network analysis is performed on the communication content after hashing, and visualization of the social network analysis includes thread graphs and/or circular graphs.

7 Claims, 4 Drawing Sheets

OTHER PUBLICATIONS

Krebs, Valdis, "Social Network Analysis", www.orgnet.com/sna.html,(2004),2 pages.

Mrvar, A, "Centrality and Prestige", 1-19.

Schwartz, Michael F., et al., "Discovering Shared Interests Using Graph Analysis", *CACM*, 36(8), (1998),78-89.

Tyler, Joshua R., et al., "Email as Spectroscopy: Automated Discovery of Community Structure within Organizations", [http://xxx.lanl.gov/arXiv:cond-mat/0303264], (2003), 16 pages.

Wellman, Barry, "Computer Networks as Social Networks", *Science*, 293, (Sep. 2001),2031-2034.

Whittaker, Steve, et al., "Contact Management: Identifying Contacts to Support Long-Term Communication", *CSCW*, (Nov. 2002),10 pages.

Coreless, R.M., Gonnet, G.H., Hare, D.G., Jeffrey, D.J., & Knuth, D.E., (1996). "On the Lambert W Function", Advances in Computational Mathematics, 329-359, [https://www.cs.uwaterloo.ca/research/tr/1993/03/W.pdf].

Huffman, D.A. (1952), "A Method for the Construction of Minimum-Redundancy Codes", Proceedings of the IRE, pp. 1098-1101, [http://compression.ru/download/articles/huff/huffman_1952_minimum-rdundancy-codes.pdf].

Manning, C.D. and Schutze, H., "Foundations of Statistical Natural Language Processing", MIT Press. 1999, [http://acl.ldc.upenn.edu/J/J00-2011.pdf] vol. 26, No. 2. Computational Linguistics, pp. 277-279.

"Military Cryptanalytics", vol. 2, Part 2, W.F. Friedman & L.D. Callimohos, 1946, 1985, Shannon, C. (1949), The mathematical theory of Communication, Urbana: University of Illinois Press, [http.//www.nsa.gov/public/mil_crypt_II.pdf].

Thomas, A.J., & Cover, T.M. (1991), "Elements of Information Theory", New York: Wiley, [http://139.179.21.143/~exa/InformationTheory/booktext.pdf.

Wallace, C.S. (1999, vol. 42), "Minimum Message Length and Kolmogorov Complexity", Computer Journal, pp. 270-283, [http://www.ebi.ac.uk/~vilo/edu/Tekstialgoritmid_I/Articles/Compression/Kolmogorov_Complexi].

Ziv, J., & Lempe, A. (1978), "Compression of Individual Sequences Via Variable-Rate Coding", Information Theory, IEEE Transactions on, pp. 530-536, [http://www.cs.duke.edu/courses/spring03/cps296.5/papers/ziv_lempel_1978_variable-rate.pdf].

Krebs, Valdis, "Social Network Analysis", www.orgnet.com/sna.html,(2004),2 pages.

\* cited by examiner

METHODS AND SYSTEMS FOR ENABLING ANALYSIS OF COMMUNICATION CONTENT WHILE PRESERVING CONFIDENTIALITY

RELATED APPLICATIONS

This application is a continuation-in-part of U.S. application Ser. No. 10/944,644 filed 17 Sep. 2004 now abandoned by Marshall Van Alstyne, Jun Zhang, titled: METHODS AND SYSTEMS FOR ANALYZING COMMUNICATION CONTENT WHILE PRESERVING CONFIDENTIALITY, which claims the benefit of U.S. provisional application Ser. No. 60/504,383 filed 19 Sep. 2003 by Marshall Van Alstyne, Jun Zhang, titled: A MECHANISM TO PERMIT ANALYSIS OF COMMUNICATION CONTENT THAT PRESERVES PERSONAL PRIVACY. Said application Ser. Nos. 10/944,644 and 60/504,383 are hereby incorporated by reference herein.

GOVERNMENT RIGHTS

The U.S. Government may have a paid-up license in this invention, and may have the right, in limited circumstances, to require the patent owner to license others on reasonable terms as identified by the terms of NSF Career Award Grant No. IIS9876233.

FIELD OF INVENTION

The present invention relates generally to analysis of communication content and, more particularly, to a system and method for enabling analysis of similarity of instances of communication content while preserving personal privacy.

BACKGROUND OF THE INVENTION

One of the main obstacles to testing hypotheses relating to labor and in particular white-collar labor is the difficulty of obtaining individual specific measures of input and output.

Email and other forms of inter-personal communications represent a valuable and pervasive means of business, social and technical exchange. These forms of communication can provide much data for research on communities and social networks. As a measure of collaboration, information proximity, and knowledge exchange, email and other forms of inter-personal communication that can be digitized and rendered into text afford the possibility of direct observation that has many advantages over traditional self-report survey methods. Despite the rich literature and rising interest among social scholars in studying these forms of communication, there are few tools that can help researchers actually gather these forms of communication and extract status cues while handling privacy concerns. The absence of such tools greatly limits research progress in many of the social sciences.

SUMMARY OF THE INVENTION

According to the present invention there is provided a system for enabling analysis of similarity of instances of communication content while preserving confidentiality, comprising: means for capturing communication content including instances of communication content that can be rendered into text; means for processing the captured communication content to adjust a level of similarity between separate instances of communication content; and means for hashing at least part of the processed communication content to obscure the actual communication content and to produce hashed tokens.

According to the present invention there is also provided a method of enabling analysis of similarity of instances of communication content while preserving confidentiality, comprising: capturing communication content including instances of communication content that can be rendered into text; processing the captured communication content to adjust a level of similarity between separate instances of communication content; and hashing at least part of the processed communication content to obscure the actual communication content and to produce hashed tokens.

According to the present invention there is further provided a method of visualizing a communication interaction between at least two social units, comprising: choosing a period of time; selecting at least one entire communication between at least two social units which occurred during the chosen period of time; and visually indicating when during the chosen period of time at least one of the selected entire communications occurred and a direction of the visually indicated entire communication.

According to the present invention there is still further provided a method of visualizing a social network, comprising: selecting information related to a social network to visualize; and displaying a node representing a social unit at a radius whose length is reflective of the information.

According to the present invention there is yet further provided a method of analyzing the similarity of communications while preserving the confidentiality of the communications, comprising: capturing at least two entire communications; processing the at least two entire communications to improve the similarity of any similar content within the at least two entire communications and to reduce the similarity of any dissimilar content within the at least two entire communications; encrypting the at least two processed communications to generate tokens which obscure the actual content and are similar in nature for similar content; and comparing the tokens to identify similar content within the at least two processed communications without determining the actual content of the least two processed communications.

BRIEF DESCRIPTION OF THE DRAWING FIGURES

The invention is herein described, by way of example only, with reference to the accompanying drawings, wherein.

DETAILED DESCRIPTION OF THE INVENTION

Figure 1:
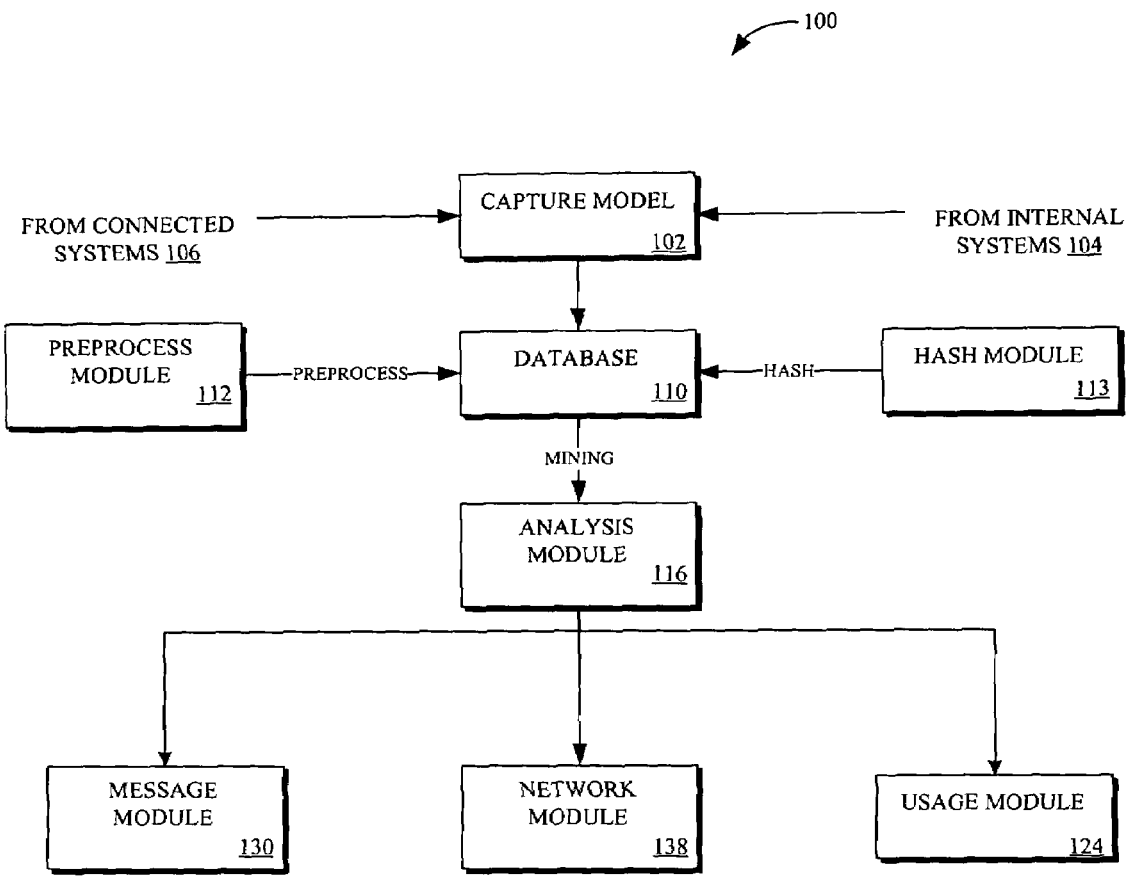
FIG. 1 is a block diagram of a system for gathering and handling communications, according to an embodiment of the present invention.

Described herein are embodiments of the present invention including methods and systems for enabling analysis of communication content while preserving confidentiality. More specifically, the systems and methods apply linguistic techniques to adjust the level of similarity of separate instances of communication content, if the level is imprecise, while applying cryptographic techniques to obscure the actual content.

The term text-renderable communication and variants thereof as used below refers to any form of communication that can be digitized and rendered into text. Examples of text-renderable communications include inter-alia: email, sms, fax, and text transcripts of voice communications (for example rendered into text through a voice recognition system).

The term entire communication and variants thereof as used below refer to a whole communication unit, for example, one email, one sms, one fax, one voice conversation, one correspondence letter, etc., which is separated from other communication units by time and/or space.

The term instance of communication content and variants thereof as used below refer to a distinct unit of communication content. Examples of distinct units include inter-alia: a word within an entire communication a phrase within an entire communication, the contents of one field within an entire communication, and the contents of an entire communication.

The term communication network and variants thereof as used below refers to any suitable combination of physical communication means and application protocol. Examples of physical means include, inter-alia: cable, optical (fiber), wireless (radio frequency), wireless (microwave), wireless (infrared), twisted pair, coaxial, telephone wires, underwater acoustic waves, etc. Examples of application protocols include inter-alia Short Messaging Service Protocols, File Transfer Protocol (FTP), Telnet, Simple Mail Transfer Protocol (SMTP), Hyper Text Transport Protocol (HTTP), Simple Network Management Protocol (SNMP), Network News Transport Protocol (NNTP), Audio (MP3, WAV, AIFF, Analog), Video (MPEG, AVI, Quicktime, RM), Fax (Class 1, Class 2, Class 2.0), and tele/video conferencing. In some embodiments, communication network can alternatively or in addition to be identified by the middle layers, with examples including inter-alia the data link layer (modem, RS232, Ethernet, PPP point to point protocol, serial line internet protocol-SLIP, etc), network layer (Internet Protocol-IP, User Datagram Protocol-UDP, address resolution protocol-ARP, telephone number, caller ID, etc.), transport layer (TCP, Smalltalk, etc), session layer (sockets, Secure Sockets Layer-SSL, etc), and/or presentation layer (floating points, bits, integers, HTML, XML, etc). For example the term "Internet" is often used to refer to a TCP/IP network. In some embodiments, communication network includes one technology whereas in other embodiments communication network includes a combination of technologies.

The term internal systems and variants thereof as used below refers to one or more systems of an organization, company, individual, group, or any other type of host entity which owns the text-renderable communications by virtue of the communications residing on those systems, the communications originating or destined for that entity, or any other reason which confers ownership. The term host entity and variants thereof as used below refers to the organization, company, individual, group or any other type of entity which owns the text renderable communications.

The term connected systems and variants thereof as used below refers to one or more systems connected to the internal systems by any communication network.

Examples of internal and or/ connected systems include inter-alia computer systems, computer servers, fax systems, telephone systems, sms systems, mail servers, IMAP clients, etc.

The term social unit and variants thereof as used below refers as appropriate to an individual, a group of individuals, a company, an organization, a computer or another information/knowledge processing entity.

The term social network analysis and variants thereof as used below refers to the mapping and measuring of relationships and flows among individuals, groups of individuals, companies, organizations, computers or other information/knowledge processing entities (i.e. among social units). The nodes in the network represent the social units, while the links (i.e. connections) show relationships or flows between the nodes.

The term token and variants thereof as used below refers to a unique identifier comprising a string of symbols.

The term hashing and variants thereof as used below refers to a mathematical function that maps one set of tokens to another, with a measurable level of information loss, possibly zero.

The term level of information proximity and variants thereof as used below refers to the level of closeness by any appropriate information distance metric.

The term small world effects and variants thereof as used below refers to a pattern of connection that has two properties. The first property is short average path lengths between random nodes. The second property being a high clustering coefficient, where the clustering coefficient is an index of the extent in which the neighbors of a given node tend to be connected to each other independent of that node.

The term weak ties and variants thereof as used below refers to a link or tie between nodes that has a lower frequency of interaction, lower affiliation, or otherwise lower volume of information flow.

The term structural holes and variants thereof as used below refers to a gap in the ties between two groups of nodes that represent distinct information pools.

The term polar geometrical measure and variants thereof as used below refers to a geometrical measure used in a circular layout. Examples of polar geometrical measures include inter-alia: radius, diameter, angle from horizontal axis, and angle from vertical axis (where the angle is a measure of arc).

The term centrality measures and variants thereof as used below captures the extent to which nodes are better positioned to send and receive flows between nodes in an undirected network. The three most popular measures for a node are Degrees, Betweenness, and Closeness. Degrees measure the number of direct connections a node has. Betweenness measures if a node lies on several short paths between pairs of other nodes. Closeness measures the accessibility to other nodes.

The term prestige measures and variants thereof as used below refers to measures of influence or support for a node in a directed network.

The terms knowledge groups and informal practice groups and variants thereof as used below refer to groups whose members have and exchange similar information.

The principles and operation for preparing communication content for analysis while preserving confidentiality according to the present invention may be better understood with reference to the drawings and the accompanying description. All examples given below are non-limiting illustrations of the invention described and defined herein.

FIG. 1 illustrates a block diagram of a system 100 for gathering and handling text-renderable communications, according to an embodiment of the present invention.

System 100 can be made up of any combination of software, hardware and/or firmware that performs the functions as defined and explained herein. The division of system 100 into the modules shown in FIG. 1 is for ease of understanding and in other embodiments any illustrated module may be separated into a plurality of modules or alternatively combined with other modules. Unless specifically stated otherwise below, the modules of system 100 may be centralized or the modules may be distributed over more than one physical unit and/or physical location. Each of modules 102, 110, 112, 113, 116, 124, 130, 138 can be made of any combination of software, hardware, and/or firmware that performs the functions as defined and explained below.

Figure 2:
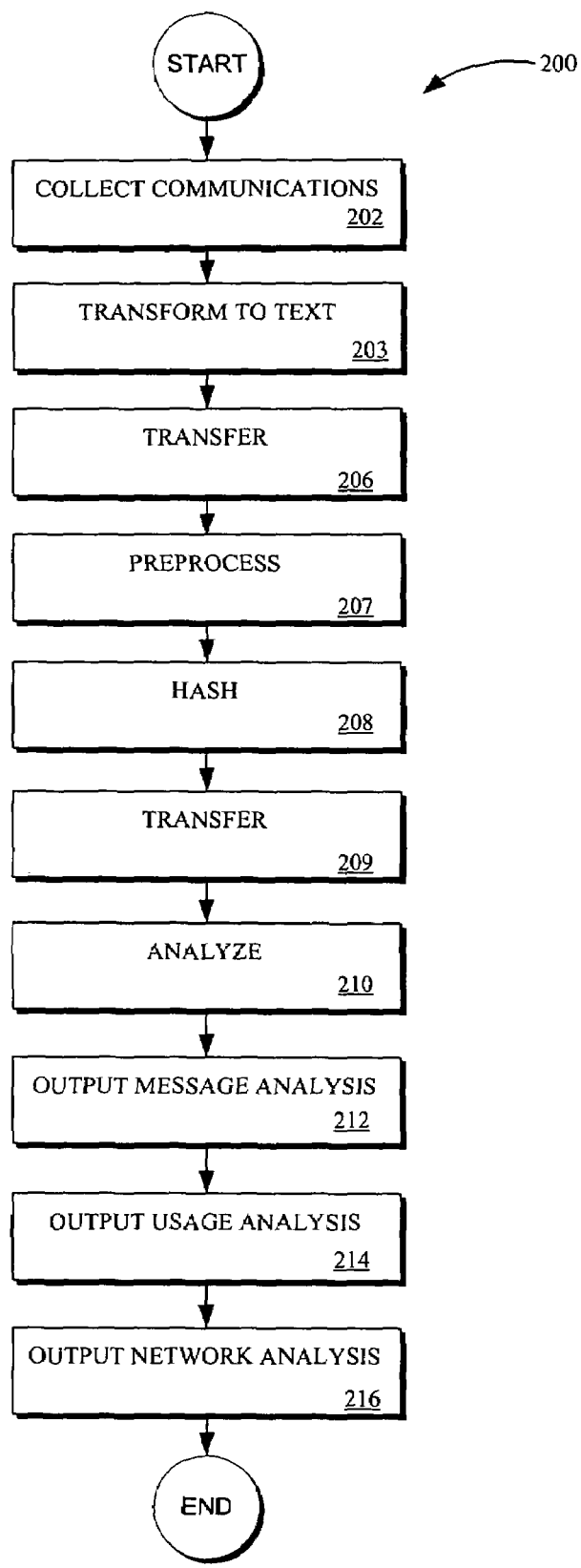
FIG. 2 is a flowchart of a method for gathering and handling communications, according to an embodiment of the present invention.

FIG. 2 illustrates a method 200 for gathering and handling text-renderable communications, according to an embodiment of the present invention, where method 200 can be executed by system 100. The invention is not bound by the specific stages or order of the stages illustrated and discussed with reference to FIG. 2. It should also be noted that alternative embodiments can include only selected stages from the illustrated embodiment of FIG. 2 and/or additional stages not illustrated in FIG. 2.

In stage 202 capture module 102 collects one or more text-renderable communications from one or more internal systems 104 of one or more host entities and/or from one or more connected system 106. For ease of description, the plural form of systems will be used below even though the collection can be from a single internal system 104 and/or from a single connected system 106.

The collection of text-renderable communications requires several considerations including inter-alia: what types of text-renderable communications to collect, how to collect communications, when to collect the communications, and the attributes of the collected communications.

Examples of text renderable communications which can be collected include one or more of the following inter-alia: email, sms, fax, and text transcripts of voice communications.

Depending on the embodiment, the communications collected can include live communications, archival communications, combinations of live and archival communications other time dependent communications and/or other time independent communications.

Depending on the embodiment the text-renderable communications can be collected remotely or locally to internal systems 104 and/or connected systems 106, each collection method having advantages. In an embodiment where text-renderable communications is collected remotely, capture module 102 captures the text renderable communications from internal systems 104 and/or from connected systems 106 using any suitable communication network which allows a remote connection. For example, capture module 102 can remotely access one or more mail servers and/or personal IMAP servers to capture email communications. In an embodiment with remote capture, the external access by capture module 102 to internal systems 104 and/or connected systems 106 may in some cases increase the risk of malicious tampering. In addition or alternatively, remote access may in some cases increase the risk of legal liability for potential access to other critical data resident on the same internal systems 104 and/or connected systems 106.

In an embodiment where text-renderable communications are instead collected locally, software may in some cases be installed on internal systems 104 and/or connected systems 106 in order to locally capture the communications. For example, in order to locally capture email communications, the installed software for local collection can be for example code written for the commercially dominant email server package MS Exchange using published application program interfaces (APIs) for scanning directories and gathering data. In some cases by installing capture software on on-site internal systems, increased system load, system crashes, and/or maintenance responsibilities can result.

The collection of text-renderable communications can involve differing levels of staffing (ranging from none/automatic, to a dedicated staff) depending on the embodiment.

With regard to timing of the collection of text-renderable communications, depending on the embodiment, collection can be continuous throughout the day or confined to certain hours during the day (where here and below the term "day" refers to a 24 hour period). In addition depending on the embodiment, text-renderable communications can be collected during a long time period or during a short time period.

Depending on when the collection takes place, the text-renderable communications can be those sent and/or received during the collection period, those sent and/or received since the last collection (which are still stored on internal systems 104 and/or connected systems 106), or stored text-renderable communications. For example continuous collection may in one embodiment collect the text-renderable communications as the communications are sent and/or received. As another example, time-confined collection may in one embodiment collect the text-renderable communications sent and/or received since the last collection which are still stored on internal systems 104 and/or connected systems 106. As another example, the collected text-renderable communications can be text-renderable communications stored in archives which are collected by capture module 102 for example only after a pre-determined time period has elapsed from the sending or receiving of those text-renderable communications.

Data bias may be more likely if stored text-renderable communications are collected only during certain hours during the day and/or for a shorter period of time. For example, intermittent collection may in some cases result in potentially serious data loss from deletions of stored text-renderable communications. If the pattern of deletions is inconsistent the sample may in some cases be unrepresentative and much less useful for inferential statistics. For example the sample may in some cases be unrepresentative if certain social units within a host entity are more likely to delete text-renderable communications, if certain host entities are more likely to delete text renderable communications, if text renderable communications on certain topics are more likely to be deleted, if communications received/sent at certain time periods are more likely to be deleted, etc.

Despite the risk for data bias, in some embodiments there may be compelling reasons to confine communication collection to certain hours during the day and/or to a short period of time. For example, if communications are collected locally then in some cases in order to reduce system load, the collection may be run only during low load periods and not continuously. In these embodiments, data bias can be reduced or eliminated by other means, for example by resetting system switches based on common system backup methods. Continuing with the example, in some systems configuration parameters can be set to prevent expunging of emails for a period of 24 hours, thereby providing a window of time to create a backup.

Depending on the embodiment one or more of the following characteristics of a text-renderable communication inter-alia can affect whether a communication is captured: topic of the communication, ingoing versus outgoing status, and identities of senders/receivers.

In certain embodiments, text-renderable communications related to all topics are collected whereas in other embodiments text-renderable communications relating to only certain pre-determined topics may be collected. For example, assuming an email communication the topic of an email may be determined based on the "subject" line of the email and only those emails whose subjects relate to predetermined topics are collected. The topics that are collected may or may not change during the collection period.

Depending on the embodiment, sent communications, received communications, or both sent and received communications can be collected.

Depending on the embodiment, text renderable communications relating to differing numbers of social units within a host entity and/or differing numbers of host entities may be collected. For example, in one embodiment text-renderable communications originating or destined for any social unit within a host entity may be collected whereas in another embodiment only those communications originating or destined for individuals belonging to one or more groups (e.g. belonging to one or more departments, having one or more ranks, fitting one or more profiles, etc) within one or more host entities may be collected.

In some embodiments, the number of social units on whom data is collected may be limited due to concern for personal privacy, and/or due to organizational information gathering policies. For example, in some embodiments perceived intrusions on personal privacy can dramatically reduce sample sizes. As another example in some embodiments, voluntary participation of individuals may be required, as human subject review boards may require both informed consent and voluntary participation. Preferably, privacy is assured through the configuration of system 100 so that voluntary participation is encouraged and not discouraged.

In optional stage 203, capture module 102 transforms the captured text-renderable communications into text. For example, assuming that the captured communication is a bitmapped printed fax, character recognition tools can be applied to the fax to render the fax into text. As another example, application specific formatting characters (for example bold fonts or italic fonts in MS word or HTML files) may be stripped from the communication. As another example speech recognition tools may be applied to a voice communication to render the communication into text.

If the captured text-renderable communication is already in a satisfactory text format, then stage 203 may be omitted.

In optional stage 206, the collected (and optionally transformed) text-renderable communication are transferred to database 110. The transfer of the communications is via any suitable communication network as defined above. For example, if capture module 102 and database 110 are located in the same physical location, the communication network may be a local area network. As another example, if database 110 and capture module 102 are separated by a distance, the communication network may be configured to transfer data remotely. Remote transfer can occur by any means, such as for example using secure FTP to transfer one way out from capture module 102 to database 110.

In some embodiments transfer stage 206 optionally includes a prior encryption of the text-renderable communications to avoid interception problems during transmission. Also optionally in some embodiments, transfer stage 206 may include backing up the transmitted communications at least for a certain period of time, for example for several days, so that retransmission to database 110 can reoccur in the event of failure. The backing up can occur for example at capture module 102, internal systems 104 and/or connected systems 106. In some embodiments, communications transferred in stage 206 are eventually deleted from internal systems 104 and/or connected systems 106 (either immediately after capture and/or after correct transmission was ensured), while in other embodiments, copies of some or all of the transferred communications may be retained, for example on internal systems 104 and/or connected systems 106. For example copies of some or all of the transferred communications may be retained so that the one or more host entities can ensure compliance with agreed upon access.

Transfer stage 206 (and the associated communication network) may be omitted, for example if database 110 is integrated with capture module 102.

In stage 207 the text-renderable communications are pre-processed by preprocessing module 112 (interchangeably referred to as processing module 112 below). Depending on the embodiment, preprocessing stage 207 (interchangeably referred to processing stage 207 below) can include any appropriate techniques to adjust, if necessary, the level of similarity between separate instances of communication content and produce (natural language) tokens which after hashing can be effectively analyzed, for example for content patterns.

Depending on the techniques used in a particular embodiment, the level of similarity can be increased for instances of communication which superficially appear to be dissimilar and/or the level of similarity can be decreased for instances of communication which superficially appear to be similar, as will be apparent to the reader from the description below.

In one embodiment where the text-renderable communications had been encrypted prior to transfer in stage 206, the communications may first be decrypted in stage 207 before applying appropriate techniques to produce tokens.

In one embodiment, pre-processing in stage 207 identifies and separates spam among email communications from public broadcast and group lists, and discards the spam before applying appropriate techniques to produce tokens.

Examples of techniques which can be applied to text-renderable communications (in order to produce tokens which after hashing can still be effectively analyzed) include one or more of the following inter-alia: correcting typographical errors, identifying communications related to the same social unit even though the communications appear to be related to different social units, identifying idiomatic expressions and diagramming sentence structure, dropping stop words, and applying morphological techniques to reduce the dissimilarity of similar words and expressions and/or increase the dissimilarity of dissimilar words and expressions.

In some embodiments preprocessing module 112 implements several filters to apply one or more of these techniques but also leaves enough flexibilities to let users adjust the process themselves. In other embodiments, all the preprocessing techniques are handled automatically without user intervention.

For example correcting typographical errors can include running the communications through a spell check to correct any misspellings.

For example, identifying the same social units can include merging multiple identities, multiple aliases, multiple accounts, multiple phone/fax numbers, multiple email boxes/email addresses etc., for the same social unit. Continuing with the example, if an individual has a first and last name, a commonly used nickname, two email addresses, one fax number, one cellular phone number and one landline phone number, preprocessing module 112 can map all of these to the same individual.

In one embodiment for example, in order to merge multiple identities for email communications, preprocessing module 112 may automatically use a heuristic searching process to map the names of social units with corresponding email addresses while allowing users to import a name-email address dictionary from organization directories into preprocessing module 112 to improve the mapping results.

In one embodiment, for example, in order to merge multiple aliases, preprocessing module 112 may use a table of likely abbreviations (e.g. David=Dave=D., etc or William=Will=Bill) and also shortenings and permutations of string matches within names.

For example, identifying idiomatic expressions and diagramming sentence structure can include identifying the parts of each sentence (i.e. noun phrases, verb phrase, prepositional phrases, etc). Continuing with the example, by identifying the parts of a sentence, preprocessing module 112 can help reduce the diversity of interpretation of words in different uses thereby enabling a reduction in the level of similarity for dissimilar words, for example "wind" (noun: moving air) versus "wind" (verb: as in turn a clock spring) and "saw" (noun: cutting tool) versus "saw" (verb1: to cut) versus "saw" (verb2: past tense of "to see"). Preprocessing module 112 can then map the correct interpretation of the word to a correct corresponding token.

For example stop words can include words with low information content or which are redundant. Continuing with the example words that may be dropped by preprocessing module 112 and excluded from mapped tokens can include one or more of the following words inter-alia: determiners ("a", "an", "the", etc.), possessives ("his", "her", "its", etc), conjunctions ("and", "but", etc) and prepositions ("of, "at", etc) after a prepositional phrase has been identified. Typically these words can be dropped from a communication and a person would still understand the original intent of the communication.

For example, morphological techniques which may be applied to reduce the dissimilarity of similar words include one or more of the following inter-alia: dropping prefixes, dropping suffixes, root stemming nouns, reducing irregular verbs to a single base (for example "be", "is" "are" "was" "were" would all be reduced to the same root), and eliminating past present and future tenses.

In some embodiments, preprocessing stage 207 also includes changing the order of the natural language tokens resulting from the preprocessing techniques described above. For example the sequence of tokens comprising a text-renderable communication can be sorted in any number of ways (for example by frequency of token occurrence, by alphabetical order, etc.) in order to disturb the ability to reconstruct the original communication. Depending on the embodiment, the disordering can be applied within a sentence of the communication, within a section of the communication, within one or more fields of the communication, across the entire text-renderable communication, etc. In one embodiment, the disordering is applied separately within each field (and not across fields), where each field contains different specific document header information such as subject, to, from, cc, bcc, timestamp, etc.

In embodiments where there is a loss of both word order and specific morphological cues, literal interpretation is difficult even without the later hashing (see below stage 208).

In one embodiment the output of preprocessing module 112 and stage 207 is for example, a set of natural language tokens that are recognizable as English (or whatever the language the text-renderable communications were in) but are not standard language and would be difficult although not impossible to interpret.

Preferably the preprocessing performed in stage 207 by preprocessing module 112 increases the probability that the hashing applied in stage 208 does not destroy the underlying similarity of superficially dissimilar communications. Therefore even after hashing content patterns for example have a higher likelihood of being preserved.

In stage 208, at least part of the pre-processed data is hashed by hash module 113. Hashing is executed in order to map natural language tokens output from pre-processing stage 207 into tokens that are not recognizable as English (or whatever the language the text-renderable communications were in). The hashing therefore obscures the actual content of the text-renderable communications and thereby protect the privacy of the host entity and/or any components thereof (e.g. workers, departments, etc). The communication content which is obscured by hashing includes one or more of the following inter-alia: the author of the communication, the recipient of the communication, the topic of the communication, the body of the communication, and any other part of the communication. Any suitable hashing algorithm can be performed in stage 208 by hash module 113 in order to obscure the actual content.

The hashing algorithm is preferably non-invertible, meaning that even using standard cryptanalysis it would be very difficult to map the output hashed tokens back to natural language tokens from the input.

In some embodiments, the sequence of hashed tokens comprising a text-renderable communication can be sorted in any number of ways, for example by frequency of token occurrence, by alphabetical order, etc. further disturbing the ability to reconstruct the original communication. The result of the disordering is disordered symbol vectors. Depending on the embodiment, the disordering can be applied within a sentence of the communication, within a section of the communication, within one or more fields of the communication, across the entire text-renderable communication, etc. In one embodiment, the disordering is applied separately within each field (and not across fields), where each field contains different specific header information such as subject, to, from, cc, bcc, timestamp, etc.

The hashed tokens output by hash module 113 have obscured actual content, but due to the preprocessing are similar for similar instances of communication content and/or dissimilar for dissimilar instances of communication content so that analysis can be effectively performed.

In some embodiments, the output of hashing stage 208 may retain certain (unhashed) natural language tokens and/or retain the format of certain fields (without compromising confidentiality) in order to facilitate analysis in stage 210 (see below). For example, the natural tokens "date", "time", "subject", "to, "from", etc may be retained to facilitate later analysis.

If the analysis to be performed in stage 210 includes social network analysis, the output of hashing stage 208 may in some embodiments retain certain (unhashed) natural language tokens and/or retain the format of certain fields which allow the identification of links between nodes (without comprising confidentiality). For example, for email communications, the fields "to", "from", "cc", and "bcc" may in these embodiment be retained in recognizable form in order to allow the identification of links between nodes. Continuing with the example, the natural language tokens "to", "from", "cc" and "bcc" may be retained.

It should be noted that without the preprocessing of stage 207, whole sentences in a communication or even an entire communication may have in certain cases been reduced by hashing stage 208 to a single lengthy hashed token. This single lengthy hashed token may in some cases not have been as conducive to effective analysis as the set of hashed tokens resulting from the preprocessing stage 207 and hashing stage 208 in the described embodiments. For example, if each entire communication is reduced to a single lengthy hashed token, analysis of the hashed tokens would in some cases provide only information on redundancy between two or more entire communications and/or would only be effective for an analysis algorithm which was anticipated prior to hashing stage 208.

In one embodiment, a limit is placed on the number of text-renderable communications processed with a given hashing algorithm, and above the limit the hashing algorithm is switched or optionally switched. In another embodiment a limit is placed on certain patterns of behavior, such as trading one-word text-renderable communications. These limits may in these embodiments enhance security protection by lowering the risk from cryptographic attacks, for example attacks which include the creation of a backwards lookup table.

In some embodiments, the specific hash algorithm upon conclusion of hashing the collected and pre-processed communications may be destroyed in order to prevent a "chosen plaintext" attack by any third party malicious or otherwise.

In some embodiments, once pre-processing stage 207 is completed or once hashing stage 208 is completed, the collected communications (i.e. the raw data) is discarded. The raw data may be discarded for any reason, for example in order to reduce liability, increase privacy, etc. In other embodiments, the raw data may be retained for any, reason, for example, for record keeping, verifiability, for additional semantic analysis on the raw data, etc.

In some embodiments even if the raw data is discarded, it is possible to perform ex-poste analysis, including unanticipated analysis techniques (i.e. which were not in the original analysis algorithm), using the output of hashing stage 208. In these embodiments, because of the pre-processing techniques described here, even for some analyses that were not anticipated prior to hashing stage 208, there is no need to use the raw data, thereby increasing the flexibility and privacy of system 100.

EXAMPLE

An example is now provided to illustrate elements of stages 202, 207 and 208 for a text-renderable communication. In this example the text renderable communication is an email communication, reproduced below.

Stage 202—Fetch Original Email

Date: Sun, 17 Nov. 2002 09:54:23-0500

From: Ann <ann@univ.edu>

To: Michael Jacobs <mjacobs@univ.edu>

Cc: averhey@univ.edu, Geofrey Parkes, <gparkes@medical.com>

Subject: Re: YOUR PROPOSAL

Body:

Ok, i will look for all the pieces today then and try to get everything in Fastlane tonight. Meeting is up to you. I have to go to DRDA first thing in the morning to hand them all the PAFs so they can process all the proposals.

. . .

Ann

- -

Stage 207—Preprocess Email

Step 1. Markup the text in XML format (for example using third party API)

<P><S><NG><W C='NNP' T='W' S='Y'>Ok</W></NG><W C=',' >,</W> <NG><W

C='NN'>i</W></NG> <VG><W C='MD'>will</W> <W C='VB'>look</W></VG> <W C='IN'>for</W>

<NG><W C='PDT'>all</W> <W C='DT'>the</W> <W C='NNS'>pieces</W></NG> <W

C='RB'>today</W> <W C='RB'>then</W> <W C='CC'>and</W>

<VG><W C='VB'>try</W></VG> <VG><W C='TO'>to</W> <W C='VB'>get</W></VG><NG><W

C='NN'>everything</W></NG> <W C='IN'>in</W> <NG><W C='NNP'>Fastlane</W></NG> <W

C='RB'>tonight</W><W C='.' T='.'>.</W></S>

<S><NG><W C='NN' T='w' S='Y'>Meeting</W></NG> <VG><W C='VBZ'>is</W> <W

C='RB'>up</W></VG> <W C='TO'>to</W> <NG><W C='PRP'>you</W></NG><W C='.'

T='.'>.</W></S> <S><NG><W C='PRP' L='SL' T='w' S='Y'>I</W></NG> <VG><W

C='VBP'>have</W> <W C='TO'>to</W> <W C='VB'>go</W></VG> <W C='TO'>to</W> <NG><W

C='NNP'>DRDA</W></NG>

<NG><W C='JJ'>first</W> <W C='NN'>thing</W></NG> <W C='IN'>in</W> <NG><W

C='DT'>the</W> <W C='NN'>morning</W></NG> <VG><W C='TO'>to</W> <W

C='VB'>hand</W></VG> <NG><W C='PRP'>them</W></NG> <NG><W C='PDT'>all</W> <W

C='DT'>the</W>

<W C='NNP'>PAFs</W></NG> <W C='IN'>so</W> <NG><W C='PRP'>they</W></NG> <VG><W

C='MD'>can</W> <W C='VB'>process</W></VG> <NG><W C='PDT'>all</W> <W C='DT'>the</W>

<W C='NNS'>proposals</W></NG><W C='.' T='.'>.</W></S></P>

. . .

<P><W C='NNP' L='LL' T='W' S='Y' >Ann</W>

</P>

The meaning of the markup tags is shown below in tables 1 and 2.

TABLE 1

| | Description of XML markup applied by NLProcessor: |
|---|---|
| P | paragraph level element |
| S | sentence level element |
| QUOTE | quoted text |
| NG | noun group |
| VG | verb group |
| W | word |
| C | part of speech class. e.g. C = JJ. For the explanation |
| attribute | of the part-of-speech tag-set look at table 2 |
| N | abbreviation flag: N = A - a word is an abbreviation |

TABLE 1-continued

Description of XML markup applied by NLProcessor:

| | | |
|---|---|---|
| attribute L | signals strategy which has been applied for resolving ambiguously capitalized words. The only unreliable strategy is List Lookup (LL) and in your post-processing you can pay special attention to such cases. | |
| attribute chunk attribute | For flat XML output (see below) marks chunking information in attributes rather than NG and VG items. Possible values NGstart - word start noun group NGend - word ends noun group NGin - word is internal to a noun group e.g. not starting or ending NGstart__end - word is starting and ending noun group (e.g. noun group of - single word) VGstart - word start verb group VGend - word ends verb group VGin - word is internal to a verb group e.g. not starting or ending VGstart__end - word is starting and ending | |

TABLE 2

Modified Penn Treebank Tag-Set (open class categories)

| POS Tag | Description | Example |
|---|---|---|
| JJ | adjective | green |
| JJR | adjective, comparative | greener |
| JJS | adjective, superlative | greenest |
| RB | adverb | however, usually, naturally, here, good |
| RBR | adverb, comparative | better |
| RBS | adverb, superlative | best |
| NN | common noun | table |
| NNS | noun plural | tables |
| NNP | proper noun | John |
| NNPS | plural proper noun | Vikings |
| VB | verb base form | take |
| VBD | verb past | took |
| VBG | gerund | taking |
| VBN | past participle | taken |

TABLE 2-continued

Modified Penn Treebank Tag-Set (open class categories)

| POS Tag | Description | Example |
|---|---|---|
| VBP | verb, present, non-3d | take |
| VBZ | verb present, 3d person | takes |
| FW | foreign word | d'hoevre |

Step 2. Process the tagged xml text
Deleting stop words
Stemming
Counting frequency

TABLE 3

| Keywords | Tag | frequency |
|---|---|---|
| Fastlane | NNP | 1 |
| DRDA | NNP | 1 |
| Meeting | NN | 2 |
| PAFs | NNP | 1 |
| process | VB | 1 |
| Proposal | NN | 2 |
| . . . | | |

Stage 208 Hash the keywords

TABLE 4

| Keywords Hash | Tag | frequency |
|---|---|---|
| 7253578015604498574 | NNP | 1 |
| 8763687632651980147 | NNP | 1 |
| 8871153132300476476 | NN | 2 |
| 6293576012604293570 | NNP | 1 |
| 6916544271211441138 | VB | 1 |
| 5894537654329429962 | NN | 2 |
| . . . | | |

To complete this example, the email after hashing stage 208 is shown below in table 5 along with the original email.

TABLE 5

| | Before | After |
|---|---|---|
| Header | Date: Sun, 17 Nov 2002 09:54:23 -0500 From: Ann <ann@univ.edu> To: Michael Jacobs <mjacobs@univ.edu> Cc: averhey@univ.edu, Geofrey Parkes <gparkes@medical.com> Subject: Re: YOUR PROPOSAL | Message-ID: 00000000C74E9F197619354B91 Date: 11/17/2002 09:54:23 PM From: ChiUserWWW2 To: ChiUserWWW34 CC: ChiUserWWW2, ChiUserEEE137 Subject: 2234380046220310381 -4543232654336644202 |
| Body | Ok, i will look for all the pieces today then and try to get everything in Fastlane tonight. Meeting is up to you. I have to go to DRDA first thing in the morning to hand them all the PAFs so they can process all the proposals. . . . Ann - - | -7488330257252326972<8>; 3461049762598860849<5>; -4469441121190040841<4>; 4122472038465781083<4>;-2485003116886841409<3>; 8003219831352894262<3>; 1698764591947117759<2>; 5894537654329429962<2>; -9076192449175488644<2>; 7750988586697557362<2>; 8871153132300476476<2>; - 7527789141644698404<2>; 8763687632651980147<1>; 3129683954660429336<1>; - . . . 6916544271211441138<1>; 6293576012604293570<1>; - - |
| Attachment | proposal-draft.doc | Attachment Number: 1 Attachment type list: doc<1> |

In some embodiments, the output of hashing stage 208 is stored in database 110. Depending on the embodiment, analysis module 116 can be located in the same unit, in the same location or in a different location from database 110. If located in a different location, the output of hashing stage 208 may be transferred from the location of database 110 to the location of analysis module 116 by any suitable communication network in optional stage 209, or analysis module 116 may access database 110 remotely via any suitable communication network. In another embodiment, transfer stage 209 can be omitted, for example if analysis module 116 is located in the same location as database 110.

In one embodiment, the analysis may be done by the same entity which performed the preprocessing and hashing. In another embodiment, the analysis is performed by a different entity, for example by the host entity, or by a third party entity.

Depending on the embodiment the hashed tokens can be mined by analysis module 116 for any particulars in analysis stage 210

For example, in one embodiment the hashed tokens are mined for information on social networks. For example, one or more of the following inter-alia relating to social networks can be analyzed: 1. the degree of collaboration, 2. the level of information proximity, 3. the level of knowledge exchange, 4. any differences in behavior by status, 5. any differences in effectiveness correlated with differences in use of communications technology, 6. the network tie strength for example by measuring communication frequency, longevity, and reciprocity, etc., information and productivity, 7. how information flows affect social unit output and/or other connections between information and productivity and 8. any differences in productivity based on how social units use information.

Any type of analysis can be performed in stage 210. For example, in one embodiment, the analysis can measure and/or reduce the redundancy between two or more entire communications (i.e. how much of one entire communication is included in another entire communication).

As another example in other embodiments, the analysis can instead or also measure the similarity between instances of communication content. For example in one of these embodiments, analysis includes searching for common hashed tokens across sets of hashed tokens resulting from more than one instance of communication content. Continuing with the example, analysis module 116 can search for the frequency that a hashed token corresponding to the name of a particular social unit occurs in the "to", "from", "cc", "bcc" fields of more than one entire email communication, and therefore know the frequency that the particular social unit sent/received email communications without knowing the identity of that social unit.

As another example, in another of these embodiments analysis can also or alternatively include comparing and classifying the hashed tokens resulting from more than one separate instances of communication content using methods of information retrieval, including one or more of the following inter-alia: statistics, linguistic structure analysis, information distance metrics, and syntactic or semantic cues analysis.

Examples of information distance metrics include inter-alia: cosine indexes on the vector of tokens, Kulback-Liebler distance, entropy, n-dimensional cluster, etc. Some examples of these metrics are listed below where $t_{D1j}$=The weight of an occurrence of hashed token j in entire communication D1.

$t_{D2j}$=The weight of an occurrence of hashed token j in entire communication D2.

T=the maximum number of hashed tokens in both entire communications (D1, D2)

A. Generic Document Similarity:

$$DocSim(D1, D2) = \sum_{i=1}^{T} (t_{D1j} \times t_{D2j})$$

B. Dice's Coefficient:

$$DocSim(D1, D2) = \frac{2\sum_{i=1}^{T} (t_{D1j} \times t_{D2j})}{\sum_{i=1}^{T} t_{D1j} + \sum_{i=1}^{T} t_{D2j}}$$

C. Jaccard's Coefficient:

$$DocSim(D1, D2) = \frac{\sum_{i=1}^{T} (t_{D1j} \times t_{D2j})}{\sum_{i=1}^{T} t_{D1j} + \sum_{i=1}^{T} t_{D2j} - \sum_{i=1}^{T} (t_{D1j} \times t_{D2j})}$$

D. Cosine Coefficient:

$$DocSim(D1, D2) = \frac{\sum_{i=1}^{T} (t_{D1j} \times t2)}{\sqrt{\sum_{i=1}^{T} t_{D1j} \times \sum_{i=1}^{T} t_{D2j}}}$$

E. Entropy:

$$H(X) = -\sum_{x \in X} p_i(x) \log p_i(x)$$

F. Information Content:

$ic(c) = -\log p(c)$

G. Information Similarity:

$sim(c_1, c_2) = \max_{c \in S(c_1, c_2)} [-\log p(c)]$ where p(c) simply as relative frequency:

$$p(c) = \frac{freq(c)}{N}$$

H. Lin's Information Similarity:

$$Sim_{Lin}(c_1, c_2) = \frac{2 \times sim(c_1, c_2)}{ic(c_1) + ic(c_2)}$$

I. Jiang and Conrath's Information Similarity:

$dist_{jcn}(c_1, c_2) = (ic(c_1) + ic(c_2)) - 2 \times sim(c_1, c_2)$

J. Relative Entropy or Kullback-Leibler Divergence:

$$D(p\|q) = \sum_{x \in X} p(x)\log\frac{p(x)}{q(x)} = E_p \log\frac{p(x)}{q(x)}$$

K. Mutual Information:

$$I(X, Y) = D\left(p(x, y)\|(px)(p(y))\right) = \sum_x \sum_y p(x, y)\log\frac{p(x, y)}{p(x)p(y)}$$

The usage of a cosine metric will now be expanded upon for the sake of further illustration. In one embodiment using cosine indexes, analysis stage 210 classifies text-renderable communications using a vector based semantic similarity algorithm. In this algorithm, the hashed tokens resulting from the hashing of an instance of communication content can be viewed as a hashed words vector in N-dimension space. Therefore, by calculating the cosine similarity of vectors resulting from the communications, communications can be classified or clustered into several categories.

In one embodiment, the weight given to hashed token j in the cosine formula depends on the position of hashed token j The usage of a weight which is based on position in this embodiment assumes that the hashed tokens are not completely disordered across the entire text-renderable communication, so that position retains significance.

The hashed token j used for calculating the similarity can be any hashed token, for example hashed tokens corresponding to the time of the communication, the topic of the communication, the sender or recipient of the communication, part of the body of the communication, etc.

In one embodiment, the analysis of the hashed tokens resulting from email communications takes advantage of one or more of the following known attributes of email. First, email provides plentiful data on personal communications in a standard electronic form that is relatively easy to process. Second, the high volume of data enables discovery of shared working process and relationships that were previously unknown. Third, the ubiquity of email usage makes it a good resource for identifying organizational social structure and for studying large-scale social structures across organizations, which may be more difficult to conduct with other methods. Fourth, topological patterns and tie strengths can be determined comparatively easily. These include social networks, weak ties, effects of centralization and decentralization, and small world effects. Fifth, email not only records who links to whom, but also the frequency, longevity, and reciprocity of such social interactions which might more precisely reflect a weighted organizational social network structure. Sixth, email records the content of communication, which can be used to categorize different types of social relationship by text or genre analysis. Seventh, email automatically archives the timestamp of the occurrence of social interactions in a small segment level. The temporal dimension analysis of email archives can enable looking into the dynamics of the organizational social structure. Eighth, partial social networks generated from email are close to complete social networks of organizations because of multiple copy characteristics—an email is stored in both sender's and receivers' email boxes.

In one embodiment using cosine indexes where the hashed tokens are resultant from email communications, the cosine-based algorithm is adapted to handle the special text characteristic of email communications. For example, a relatively high weight may be set to hashed tokens resulting from words in the subject line field and a relatively low weight is set to hashed tokens resulting from words in quoted replies. As another example, lower or higher weights may be granted to hashed tokens based on authors, recipients, cc and bcc recipients, as well as core substance. For example hashed tokens resulting from words in the "to" field may be granted a higher weight whereas hashed tokens resulting from words in the "cc", and "bcc" fields are granted a lower weight.

In one embodiment if not done during pre-processing stage 207, the analysis of the hashed communications can include identifying and separating spam messages from public broadcast and group lists in email communications.

Stages 212, 214 and 216 can optionally output message analysis, usage analysis, and network analysis, respectively.

In stage 212, a message module 130 outputs one or more message analysis related to the text-renderable communications. For example message analysis module 130 can output message statistics that relate for example separately to a part (for example field) of each text-renderable communication, to each entire text-renderable communication, to the text-renderable communications on average, to the text-renderable communications of a particular type on average, to the total of communications, to the total of text-renderable communications of a particular type etc. The message statistics can include data on one or more attributes of the communications relating to amount, size, contacts, time, etc. Examples of message statistics include inter-alia size of text-renderable communication, number of recipients, whether recipients are "to" or "cc", the number of attachments, timestamps of a sent text-renderable communication, timestamps of received text-renderable communications, and the number of replies to a text-renderable communication.

To give an example of data on one possible message attribute, the statistics can output one or more of the following inter-alia: the number of attachments for a particular text-renderable communication, the average number of attachments for all analyzed text-renderable communications, the average number of attachments for text-renderable communications of a particular type (for example sent on the last day of the month), the total number of attachments for all analyzed text-renderable communications, the total number of attachments for text-renderable communications of a particular type (for example sent on the last day of the month).

In optional stage 214 a usage module 124 outputs usage analysis, for example usage statistics and/or usage patterns which relate to usage of text-renderable communications by social units. The usage patterns can show for example predictable links and flows among social units (nodes). Preferably, the outputted usage analysis correlate with measures of social unit output.

Examples of usage statistics which can be outputted in stage 214 includes one or more of the following inter-alia for social units: time spent receiving text-renderable communications, time spent sending text-renderable communications, the quantity of private text-renderable communications, the quantity of public text-renderable communications, response rates of a social unit, the number of senders sending text-renderable communications to a social unit, the number of recipients of text-renderable communications from a social unit, the average size of text-renderable communications sent by a social unit, the blocks of time during the day when a social unit is active, how many simultaneous threads a social unit is carrying, the number of new topic threads per social unit, the number of replied threads per social unit, average topic thread length, what fraction of correspondence a social unit replies to, what proportion of correspondence is internal versus external, etc.

In one embodiment one or more of the outputted message and/or usage statistics is applied directly into one or more different statistic packages for exploring the correlations between usage of text-renderable communications and social unit outputs, such as revenues, etc.

In optional stage 214, usage module 124 also or alternatively generates data on usage patterns. In one embodiment, the analyzed data on usage patterns can be aggregated and presented in graphs so as to enable researchers for example through human visual or automated graphical analysis, to find patterns that would otherwise not be noticed. Types of graphs include inter-alia time distribution graphs and thread interaction graphs. For example, a bar graph could show that different social units have different patterns of developing, sending, receiving and/or handling text-renderable communications. Continuing with the example, the bar graph could show for instance the distribution of instances of communication content over time by individual author. Aggregating individual patterns into groups, for example by job type, can further explore such patterns. As yet another example, the analysis of an interaction between two or more social units can be presented visually, for instance by using a thread graph showing the direction and timing of sending and responding among two or more social units.

Figure 3:
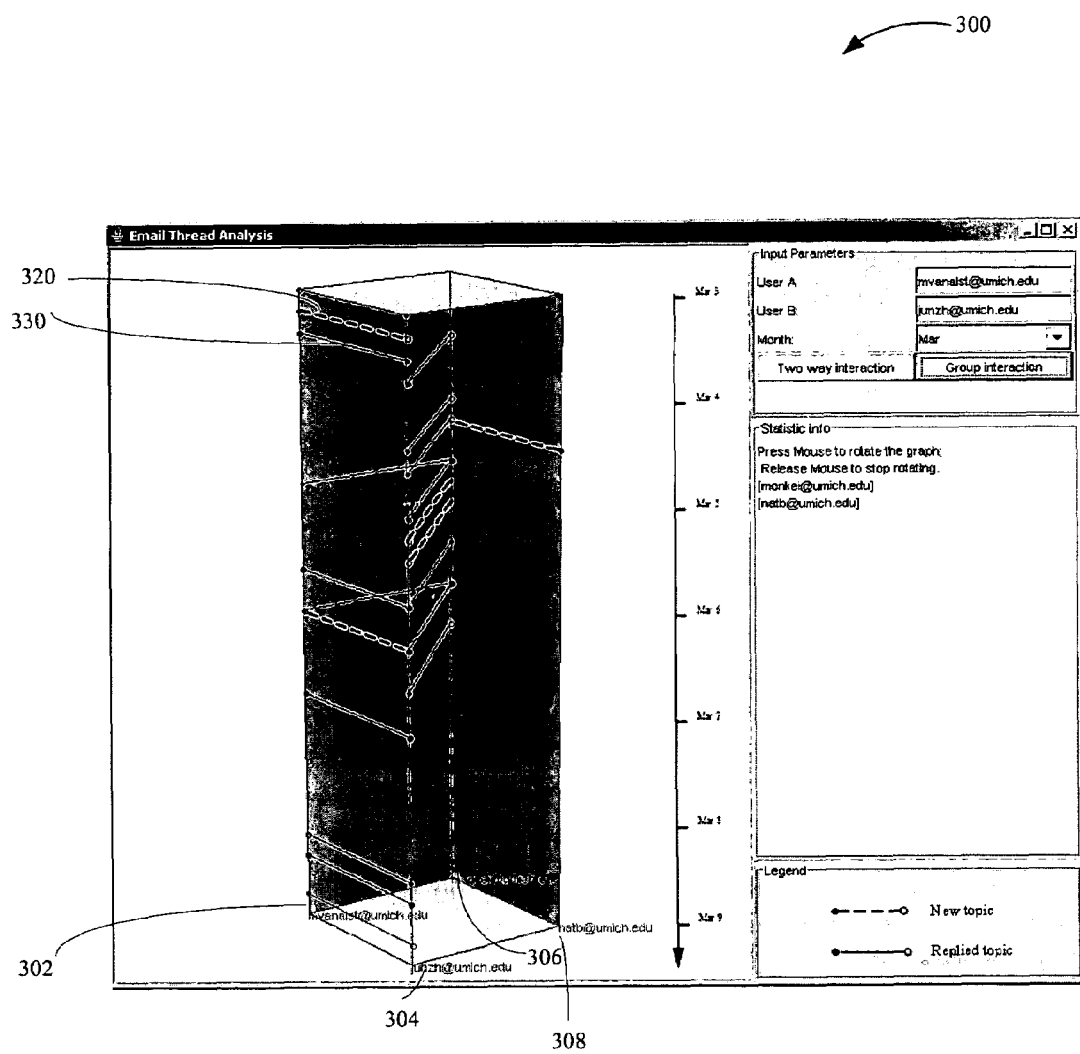
FIG. 3 is a thread graph illustrating the interaction between four social units in a given time period, according to an embodiment of the present invention.

FIG. 3 illustrates thread graph 300 which shows the interaction among four individuals including individuals 302, 304, 306 and 308 during a 6 day period, according to an embodiment of the present invention. In this example, new text-renderable communication 320 is distinguished by line type from reply text-renderable communication 330. The direction of each text renderable communication is shown through the usage of filled and unfilled line ends in this example. Due to the temporal quality of FIG. 3, the average response time to a communication, the duration of time a thread continues, and other time-based statistics can be visualized.

Optionally, a thread graph can also visually demonstrate which communications belonging to the same threads. For example each new text-renderable communication can be connected by a vertical line with any replies stemming from that new text-renderable communication. The use of connecting lines allows a better visualization of simultaneous threads among social units. Usage of connecting lines also allows easier visualization of the totality of each thread, for example of the frequency that a new communication results in reply communications, the number of reply communications in a thread, etc.

In optional stage 216, network module 138 outputs network analysis. For example, the network analysis can provide a network visualization which illustrates for example patterns in social networks.

In some embodiments, one or more filters can be used in stage 216 to dynamically change the size (i.e. complexity) and/or the threshold of connectivity of the visualized network so that real time analysis on live data can be performed. For example, in one of these embodiments, the filters can include inter-alia one or more of the following filters: traffic filter, degree filter (for example in-degree or out-degree which are the number of links in or out from a node respectively) and job type filter. For example, by setting the traffic filter between an upper and a lower threshold, users can get a network view showing only links whose strength falls between those two numbers. Such dynamic filtering may enable users to study network variables quickly and with flexibility. For example by setting a lower bound on traffic level, analysis may be able to focus on high contact social units. As another example by setting an upper bound on traffic level, analysis may be able to focus on low contact social units. Setting a lower and/or upper bound may also in some cases make a graph of the network more readable.

In another embodiment, dynamic network change is not supported. Instead, a static network map from network traffic data is generated and exported into a network visualization software to graph interesting patterns. In this embodiment, changing one parameter in constructing the network may dramatically alter the final network topologies. For example, a network generated by cutting connections above a thirty communication threshold may be very different from that generated by cutting connections above twenty communications. Therefore in this embodiment network maps may need to be recreated multiple times.

In one embodiment, network module 138 provides network visualization through one or more different graphical layout algorithms. For example network module 138 may provide general network layouts which focus on a clear network view by minimizing node overlap and/or minimizing overlap of connections between nodes.

As another example, network module may instead or additionally output a distinctive circular layout which preferably emphasizes the social context, communication patterns, and/or social unit attributes. The distinctive circular layout in some embodiments does not necessarily avoid node and/or connection overlap and therefore in some cases maintains some status and social influence information which for example may become important in analyzing effects on productivity.

In one embodiment, the circular view has two components: a circular graph and a cluster context background, both of which are discussed below.

In the circular graph view in some embodiments, a polar geometrical measure of the node allows a visualization of information. The information that is visualized can be extrinsic and/or intrinsic. For example, in one embodiment the position of a node from the center of the circle (radius) as measured in radians represents one of the centrality or prestige measures defined for social networks. Continuing with the example, using social network measures, patterns such as which social units have more access and/or influence over others in the social network can be identified. Continuing still with the example, a social unit with fewer replies could be placed at a greater distance from the center than a social unit with more replies. In another of these embodiments the radius may visualize a measure of communication patterns (intrinsic behavior) of a social unit, e.g. number of text-renderable communications sent out, how quickly a social unit responds to communications from others, percentage of communications received which are responded to, who sends more communications, who sends more communications related to a specific topic, time spent on communications, message similarity etc. As another example, the position of the node from the center can be based on other attributes, for example an extrinsic attribute such as job type.

In some embodiments using polar geometrical measures, for example the radius, the polar measures may not display a normal distribution and therefore the distribution of the nodes along the diameter tends to be congested. To minimize this problem, in one embodiment the Box-Cox power transformation reproduced here can be used so as to automatically select the power p based on the distribution of the original polar measures. For example, if nodes are skewed to the edge or alternatively to the center, reducing distinctiveness between nodes, the transformation can reduce the skew.

The standard Box-Cox transformation from regression analysis is given by the formula $T(x)=(x^p-1)/p$ where $\ln(x)$ is used for $p=0$ and p is chosen to render the data as close to normal distribution as possible.

The Box-Cox transformation not only decreases the congestion problem of the graph, the transformed polar measures also typically provides good variables for further multivariate analysis.

In another embodiment, an alternative power transformation such as the Affifi and Clark power transformation or no power transformation may be applied.

In one embodiment, a second polar geometrical measure such as a measure of the arc optionally also allows visualization of information. The visualized information can be extrinsic and/or intrinsic, relating to centrality/prestige, intrinsic behavior, extrinsic attribute etc, similarly to the description above For example to further elaborate, in the cluster context background, the position of a node along the angle (arc of node) may be decided by the communication clusters in which the social unit participates. The clusters that are used to group the nodes can be defined in any appropriate manner. For example, in some embodiments same/similar job types are spatially grouped more closely (for example by angle). In one embodiment the clusters are defined as formal organizational departments. In another embodiment, the clusters are defined as informal practice groups/knowledge groups extracted from the communication network by an automatic clustering process. For example in this other embodiment, clusters can be generated by looking for content overlap among people with similar job descriptions or looking for behavioral patterns such as the number of simultaneous conversational threads among people with similar job descriptions. In another embodiment, clusters can be generated based on one of the centrality or prestige measures defined for social networks. In another embodiment, clusters may be defined by a combination of the above or differently.

Optionally in one embodiment, other aspects of the circular graph allow visualization of information, for example the color of the node, the color of the link, the darkness (shading) of the node, the darkness (shading) of the link, the line type used for the link etc. For example, the nodes and/or links can be color/darkness/line-type coded by job type, topic of communication represented by the link (based on body of communication and/or subject line) or by any other intrinsic or extrinsic attribute (for example relating to centrality/prestige, intrinsic behavior, extrinsic attribute etc, similarly to as described above) in order to facilitate the recognition and analysis of patterns.

Figure 4:
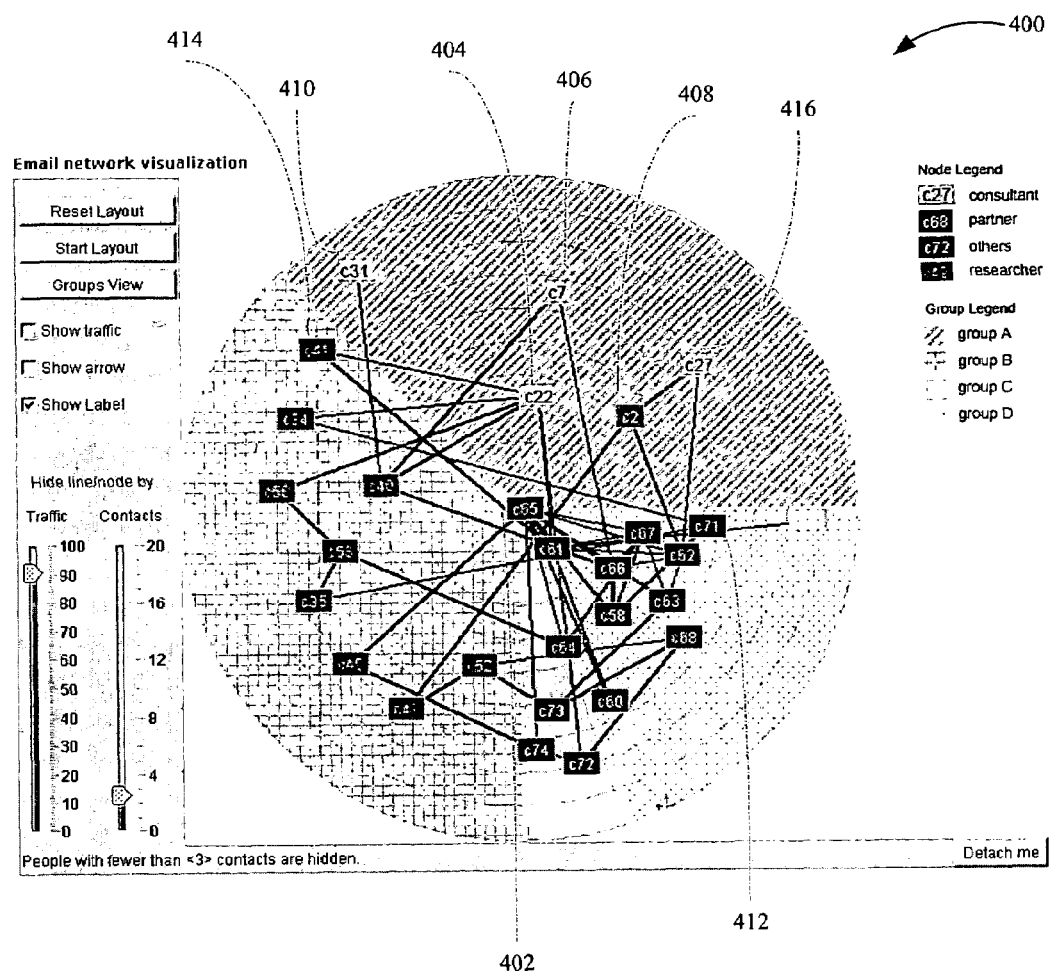
FIG. 4 is a circular graph illustrating a social network, according to an embodiment of the present invention.

Referring to FIG. 4, there is shown an example of a circular graph 400 which provides network visualization, according to an embodiment of the present invention. A node representing an individual identified as c65 402 is placed at the origin. (The identity c65 402 as well as the other identities in the graph are preferably hashed tokens to preserve confidentiality). Individual c65 402 is placed in the center because in this figure individual c65 402 is the focus of the analysis. Depending on the embodiment, c65 402 can be chosen as the focus for any reason, for example because the visualization is of the ego network of c65 402 (with c65 402 requesting the visualization), because c65 402 is the most central person in the collection of nodes, because the requester of the visualization selects c65 402 to be the focus, etc. The other nodes in FIG. 4 are placed at different circular orbits whose radius provides visualization of social network information. For example, assuming the radius of a node measures the number of times the corresponding individual is the recipient of a communication, c22 404 is the recipient of more communications than c7 406. The degrees of the arc can capture a second index. Continuing with the example, assuming the measure of the arc captures the similarity of the analyzed communications, c2 408 and c31 410 are clustered together in group A but apart from say c71 412 and c41 414. Therefore, the communications of c2 408 and c31 410 are more similar to one another than to the communications of c71 412 and c41 414. The level of darkness of each node in FIG. 4 can also provide additional visualization information. Continuing with the example the level of darkness of the node can represents the formal job type of the corresponding individual. For example different levels of darkness differentiate c27 416 as a consultant from c2 408 as a partner. In FIG. 4, connections below three communications are hidden to improve readability. The level of darkness of the connections can also provide additional visualization information. Continuing with the example, the level of darkness can distinguish communications based on topic of communication (for example based on the body and/or the subject line of the communication). Continuing with the example, in graph 400 all the connections are of equal darkness because all the communications are on the same topic.

In one embodiment, network module 138 may instead or additionally extend a single circular layout into multiple circular layouts. In this view, each sub-group has its own circle and each node's polar geometrical measure is calculated solely from intra-group communication data, thereby allowing investigation of inter-and-intra group patterns. As another example, network module 138 may instead or additionally output a spring layout with a bird's-eye view. Node and/or link colors in this view could for example represent different types of information flows categorized by the automatic information clustering method discussed earlier This view enables a look at overall information flows within the organization.

Network module 138 in some embodiments uses R Social Network Analysis as the engine for network analysis. R is an open source statistics package available at www.maths.lth.se/help/R/.R/library/sna/html/00Index.html. In addition, network visualization and analysis module 138 may in some embodiments export data to other social network analysis and visualization tools, such as UC Irvine Network (UciNet) and Pajek. UciNet is published by Analytic Technologies headquartered in Harvard, Mass. Pajek is an open package available at vlado.fmf.uni-lj.si/pub/networks/pajek/default.htm.

While the invention has been described with respect to a limited number of embodiments, it will be appreciated that it is not thus limited and that many variations, modifications, improvements and other applications of the invention will now be apparent to the reader.

What is claimed is:

1. A system for enabling analysis of similarity of instances of communication content while preserving confidentiality, comprising:
    means for capturing communication content including instances of communication content that can be rendered into text;
    means for processing said captured communication content to adjust a level of similarity between separate instances of communication content;
    means for hashing at least part of said processed communication content to obscure the actual communication content and to produce hashed tokens;
    means for analyzing said communication content, subsequent to said hashing; and means for outputting at least one selected from a group comprising: message analysis, usage analysis, and network analysis, wherein said means for outputting network analysis employs a graphical interface having a circular layout where information on a social network is provided by all parameters comprising: measure of radii of nodes representing social units in said network, measure of angles of nodes representing social units in said network, color of nodes representing social units in said network, color of links connecting nodes representing social units in said network, shading of nodes representing social units in said network, shading of links connecting nodes representing social units in said network, line-type of links connecting nodes representing social units in said network, and shading of a range of angles of nodes representing social units in said network.

2. The system of claim 1, wherein said means for outputting usage analysis employs an interface providing interaction visualization among at least two social units across a time period.

3. The system of claim 1, wherein said means for outputting network analysis includes a filter for dynamically changing the size of a social network which is being visualized.

4. The system of claim 1, wherein said means for outputting network analysis includes a filter for dynamically changing the threshold of connectivity of a social network which is being visualized.

5. The system of claim 1, wherein said means for hashing produces a plurality of hashed tokens for each entire communication included in said captured communication content.

6. The system of claim 1, wherein said means for processing said captured communication content increases a level of similarity of separate instances of communication content which superficially appear to be dissimilar, and wherein said means for hashing produces similar hashed tokens for similar instances of processed communication content.

7. The system of claim 1, wherein said means for processing said captured communication content reduces a level of similarity of separate instances of communication content which superficially appear to be similar, and wherein said means for hashing produces dissimilar hashed tokens for dissimilar instances of processed communication content.

* * * * *